US012146786B2

(12) United States Patent
Kojima

(10) Patent No.: US 12,146,786 B2
(45) Date of Patent: Nov. 19, 2024

(54) OPTICAL FIBER SENSING SYSTEM AND MONITORING METHOD INCLUDING AN ABNORMALITY DETECTOR

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 17/761,279

(22) PCT Filed: Sep. 27, 2019

(86) PCT No.: PCT/JP2019/038278
§ 371 (c)(1),
(2) Date: Mar. 17, 2022

(87) PCT Pub. No.: WO2021/059507
PCT Pub. Date: Apr. 1, 2021

(65) Prior Publication Data
US 2022/0364909 A1 Nov. 17, 2022

(51) Int. Cl.
G01H 9/00 (2006.01)
G08B 13/12 (2006.01)

(52) U.S. Cl.
CPC ............ *G01H 9/004* (2013.01); *G08B 13/124* (2013.01)

(58) Field of Classification Search
None
See application file for complete search history.

(56) References Cited

U.S. PATENT DOCUMENTS

2004/0257218 A1* 12/2004 Shibata ............ G08B 13/19656
340/522
2006/0197665 A1 9/2006 Shibata et al.

FOREIGN PATENT DOCUMENTS

| JP | H06-175806 A | 6/1994 |
|---|---|---|
| JP | 2000-321170 A | 11/2000 |
| JP | 2001-147177 A | 5/2001 |
| JP | 2001-221684 A | 8/2001 |
| JP | 2001-304822 A | 10/2001 |

(Continued)

OTHER PUBLICATIONS

[O n l i n e], Natur E Corpor Ation, Apr. 28, 2019, [retrieval date: Dec. 4, 2019], Internet:<URL: http s://web.arc hive.org/web/ 201904 28045 245/http:/! e-nature.c o.jp/produc t/p erip her y/>, entire text, all dra wings, ("Fiber Security System") (hereinafter "Nature"). (Year: 2019).*

(Continued)

*Primary Examiner* — John E Breene
*Assistant Examiner* — Nigel H Plumb
(74) *Attorney, Agent, or Firm* — Sughrue Mion, PLLC

(57) ABSTRACT

An optical fiber sensing system that includes an optical fiber provided in a monitor area, a detection unit that detects an anomaly that has occurred in the monitor area and identifies a location on the optical fiber where the anomaly is detected, based on a vibration pattern included in an optical signal received from the optical fiber, and a control unit that displays an arrangement situation of the optical fiber in an overlapping manner on a map of the monitor area, displays a mark indicating a location on the optical fiber where the anomaly is detected, in an overlapping manner on the map of the monitor area, and displays information indicating a detail of the anomaly.

14 Claims, 16 Drawing Sheets

(56) References Cited

FOREIGN PATENT DOCUMENTS

| | | |
|---|---|---|
| JP | 2005-032224 A | 2/2005 |
| JP | 2005-045712 A | 2/2005 |
| JP | 2006-163659 A | 6/2006 |
| JP | 2006-208061 A | 8/2006 |
| JP | 2017-092808 A | 5/2017 |
| JP | 2019-053483 A | 4/2019 |
| KR | 1468056 B1 | 12/2014 |

OTHER PUBLICATIONS

International Search Report for PCT Application No. PCT/JP2019/038278, mailed on Dec. 17, 2019.
Nature Corporation, "Fiber Security System", Apr. 28, 2019, <URL: https://web.archive.org/web/20190428045245/http://e-nature.co.jp/product/periphery/>, pp. 1-9.
JP Office Action for JP Application No. 2021-548282, mailed on Aug. 29, 2023 with English Translation.

* cited by examiner

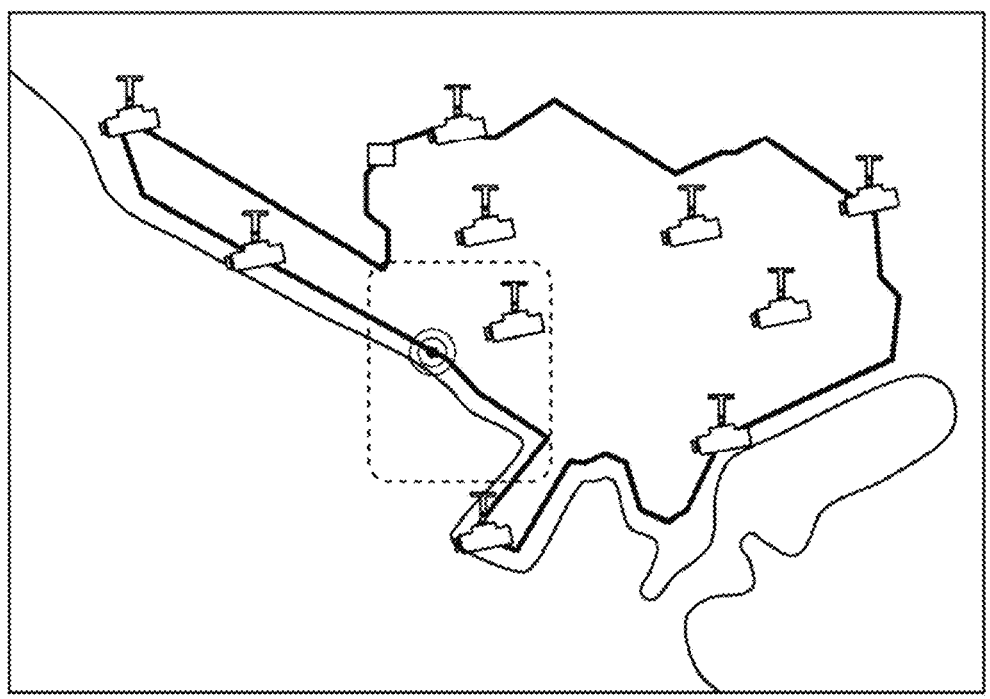
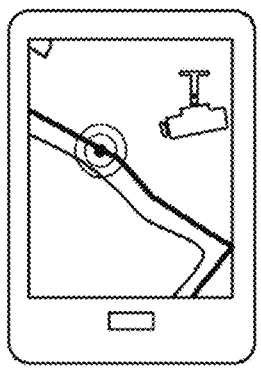
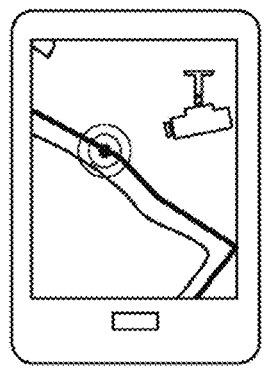
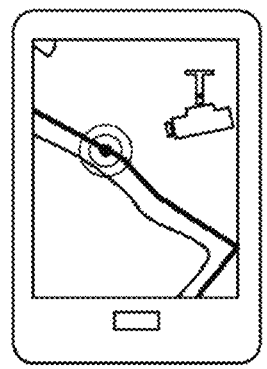
Fig. 14

OPTICAL FIBER SENSING SYSTEM AND MONITORING METHOD INCLUDING AN ABNORMALITY DETECTOR

This application is a National Stage Entry of PCT/JP2019/038278 filed on Sep. 27, 2019, the contents of all of which are incorporated herein by reference, in their entirety.

TECHNICAL FIELD

The present disclosure relates to an optical fiber sensing system and a monitoring method.

BACKGROUND ART

In recent years, techniques of detecting an anomaly that occurs in a monitor area, by using an optical fiber, have been proposed. For example, Patent Literature 1 discloses a technique of monitoring displacement and deformation of a surface layer of unstable land where landslide or mudslide is likely to occur, by using an optical fiber.

In addition, techniques of displaying an anomaly detected in a monitor area have been suggested. For example, Patent Literature 2 discloses a technique of displaying each apparatus of a monitor target plant and, in a case where an anomaly has occurred in any apparatus, enlarging and displaying the apparatus in which the anomaly has occurred.

CITATION LIST

Patent Literature

Patent Literature 1: Japanese Unexamined Patent Application Publication No. 2001-304822
Patent Literature 2: Japanese Unexamined Patent Application Publication No. H06-175806

SUMMARY OF INVENTION

Technical Problem

Meanwhile, recently, it is demanded to display an anomaly detected by using an optical fiber, in a flexible display manner in such a way as to allow the anomaly to be visually recognized.

However, the technique described in Patent Literature 2 is merely a technique of enlarging and displaying an apparatus in which an anomaly has occurred, and therefore, there is a problem that the above-described demand cannot be satisfied.

Accordingly, an object of the present disclosure is to solve the above-described problem, and to provide an optical fiber sensing system and a monitoring method that are capable of displaying, in a flexible display manner, an anomaly detected by using an optical fiber.

Solution to Problem

An optical fiber sensing system according to one aspect includes:
  an optical fiber provided in a monitor area;
  a detection unit configured to monitor the monitor area by using the optical fiber;
  a monitor; and
  a control unit configured to display a monitoring situation of the monitor area on the monitor, wherein
  the detection unit detects an anomaly that has occurred in the monitor area and identifies a location on the optical fiber where the anomaly is detected, based on a vibration pattern included in an optical signal received from the optical fiber, and
  the control unit displays, on the monitor, as a monitoring situation of the monitor area, an arrangement situation of the optical fiber in an overlapping manner on a map of the monitor area, displays a mark indicating a location on the optical fiber where the anomaly is detected, in an overlapping manner on the map of the monitor area, and displays information indicating a detail of the anomaly.

A monitoring method according to one aspect is a monitoring method by an optical fiber sensing system,
  the optical fiber sensing system including:
  an optical fiber provided in a monitor area;
  a detection unit configured to monitor the monitor area by using the optical fiber; and
  a monitor,
  the monitoring method comprising:
  a first step of, by the detection unit, detecting an anomaly that has occurred in the monitor area and identifying a location on the optical fiber where the anomaly is detected, based on a vibration pattern included in an optical signal received from the optical fiber; and
  a second step of displaying, on the monitor, as a monitoring situation of the monitor area, an arrangement situation of the optical fiber in an overlapping manner on a map of the monitor area, a mark indicating a location on the optical fiber where the anomaly is detected in an overlapping manner on the map of the monitor area, and information indicating a detail of the anomaly.

Advantageous Effects of Invention

According to the above-described aspects, an effect of being able to provide an optical fiber sensing system and a monitoring method that are capable of displaying, in a flexible display manner, an anomaly detected by using an optical fiber can be acquired.

BRIEF DESCRIPTION OF DRAWINGS

FIG. 14 is a diagram illustrating an example of a GUI screen displayed on a monitor and a terminal by a control unit according to the seventh example embodiment.

DESCRIPTION OF EMBODIMENTS

Figure 1:
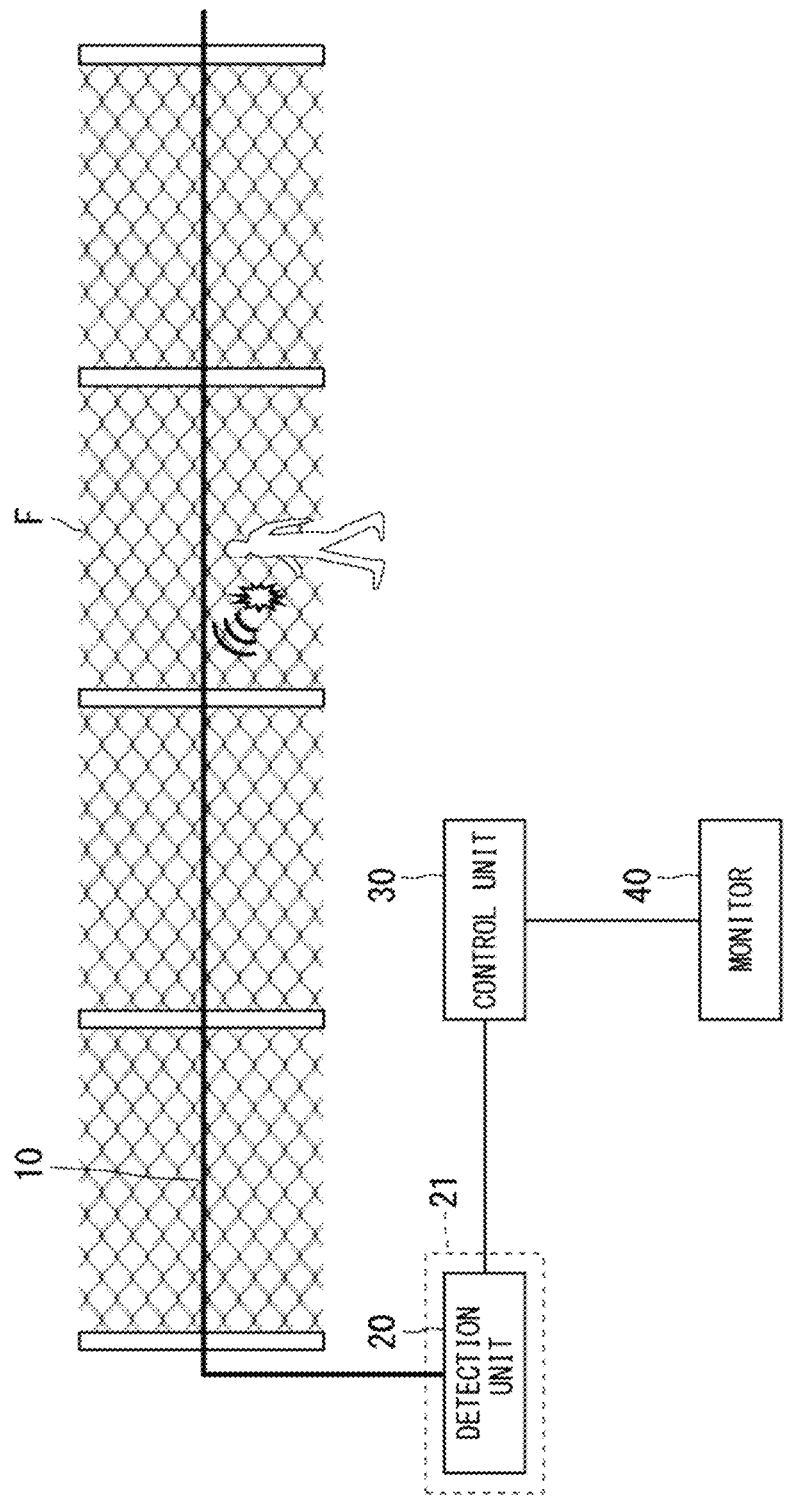
FIG. 1 is a diagram illustrating an example of configuration of an optical fiber sensing system according to a first example embodiment.

Hereinafter, example embodiments of the present disclosure will be described with reference to the drawings. In the following description and drawings, omissions and simplifications are made as appropriate for the sake of clarification of the explanation. Furthermore, in the drawings below, the same elements are denoted with the same reference numerals, and duplicate explanation thereabout is omitted as necessary. Furthermore, in the example embodiments explained below, it is assumed that a monitor area is an area provided with a fence, but the monitor area is not limited thereto.

First Example Embodiment

First, a configuration of an optical fiber sensing system according to this first example embodiment is explained with reference to FIG. 1.

As illustrated in FIG. 1, the optical fiber sensing system according to this first example embodiment monitors a monitor area in which a fence F is provided, and includes an optical fiber 10, a detection unit 20, a control unit 30, and a monitor 40. It is assumed that the detection unit 20 is contained in a box 21. A connection between the detection unit 20 and the control unit 30 and a connection between the control unit 30 and the monitor 40 may be made by wires or may be made wirelessly.

The optical fiber 10 is provided on the fence F, and one end of the optical fiber 10 is connected to the detection unit 20. However, the method for providing the optical fiber 10 is not limited thereto. For example, a part or the entirety of the optical fiber 10 may be buried in the ground in a vicinity of the fence F.

The detection unit 20 uses the optical fiber 10 to monitor the monitor area, and detect an anomaly that has occurred in the monitor area.

Specifically, the detection unit 20 makes pulsed light incident into the optical fiber 10 and receives, through the optical fiber 10, reflected light and scattered light, as return light (an optical signal), generated when the pulsed light incident is transmitted through the optical fiber 10.

In this case, the fence F vibrates when an anomaly occurs, for example, when a person grabs and shakes the fence F. The vibration of the fence F is transmitted to the optical fiber 10, and accordingly, the wavelength of the return light transmitted through the optical fiber 10 changes. Therefore, the optical fiber 10 can detect the vibration of the fence F.

In this first example embodiment, it is assumed that, for example, the following types of anomalies occur in the monitor area.

(1) A person grabs and shakes the fence F.
(2) A person strikes the fence F.
(3) A person climbs over the fence F.
(4) A person puts a ladder on the fence F and climbs the ladder.
(5) A person or an animal walks around the fence F.
(6) A person digs around the fence F.

The vibration pattern of the vibration of the fence F transmitted to the optical fiber 10 is a variation pattern that dynamically varies, and is different according to the above-described type of anomaly that occurs in the monitor area.

Therefore, the return light transmitted through the optical fiber 10 includes a vibration pattern according to the anomaly that occurs in the monitor area. The vibration pattern is a unique pattern that is different in the intensity of the vibration, the position of the vibration, the transition of variation of the number of vibrations, and the like.

Figure 2:
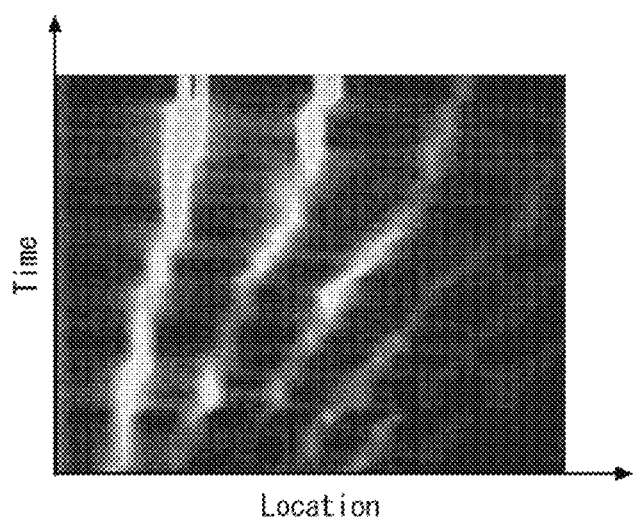
FIG. 2 is a diagram illustrating an example of sensing data generated by a detection unit according to the first example embodiment.

For example, the detection unit 20 can acquire the vibration pattern included in the return light by generating sensing data as illustrated in FIG. 2 on the basis of the return light received from the optical fiber 10. In FIG. 2, the horizontal axis indicates a location on the optical fiber 10 (a distance from the detection unit 20), and the vertical axis indicates an elapse of time. For example, the location on the optical fiber 10 can be detected on the basis of a time difference between a time when the pulse light incident is made into the optical fiber 10 and a time when the return light is received from the optical fiber 10.

The sensing data illustrated in FIG. 2 includes a vibration pattern that dynamically varies, and this vibration pattern is different according to the type of the anomaly that occurs in the monitor area. Therefore, the detection unit 20 detects whether an anomaly occurs in the monitor area by analyzing dynamic change of the vibration pattern included in the sensing data as illustrated in FIG. 2. Furthermore, in a case where the detection unit 20 detects an anomaly on the basis of the vibration pattern, the detection unit 20 identifies, as the location on the optical fiber 10 where the anomaly was detected, the location on the optical fiber 10 where the vibration pattern has occurred.

At this occasion, the detection unit 20 may detect whether an anomaly occurs in the monitor area by using a pattern matching. For example, for respective anomalies of the detection target, the detection unit 20 stores in advance, as matching patterns, vibration patterns that occur when the anomalies occur. The detection unit 20 compares the vibration pattern included in the return light with the matching patterns. In a case where there is a matching pattern among the matching patterns of which the matching rate with the vibration pattern included in the return light is equal to or more than a threshold value, the detection unit 20 determines that an anomaly corresponding to the matching pattern has occurred.

The monitor 40 is a monitor provided in a monitor center or the like that monitors the monitor area.

The control unit 30 displays, on the monitor 40, a graphical user interface (GUI) screen indicating a monitoring situation of the monitor area.

Next, hereinafter, an example of a GUI screen that the control unit 30 according to this first example embodiment displays on the monitor 40 is explained with reference to FIG. 3.

Figure 3:
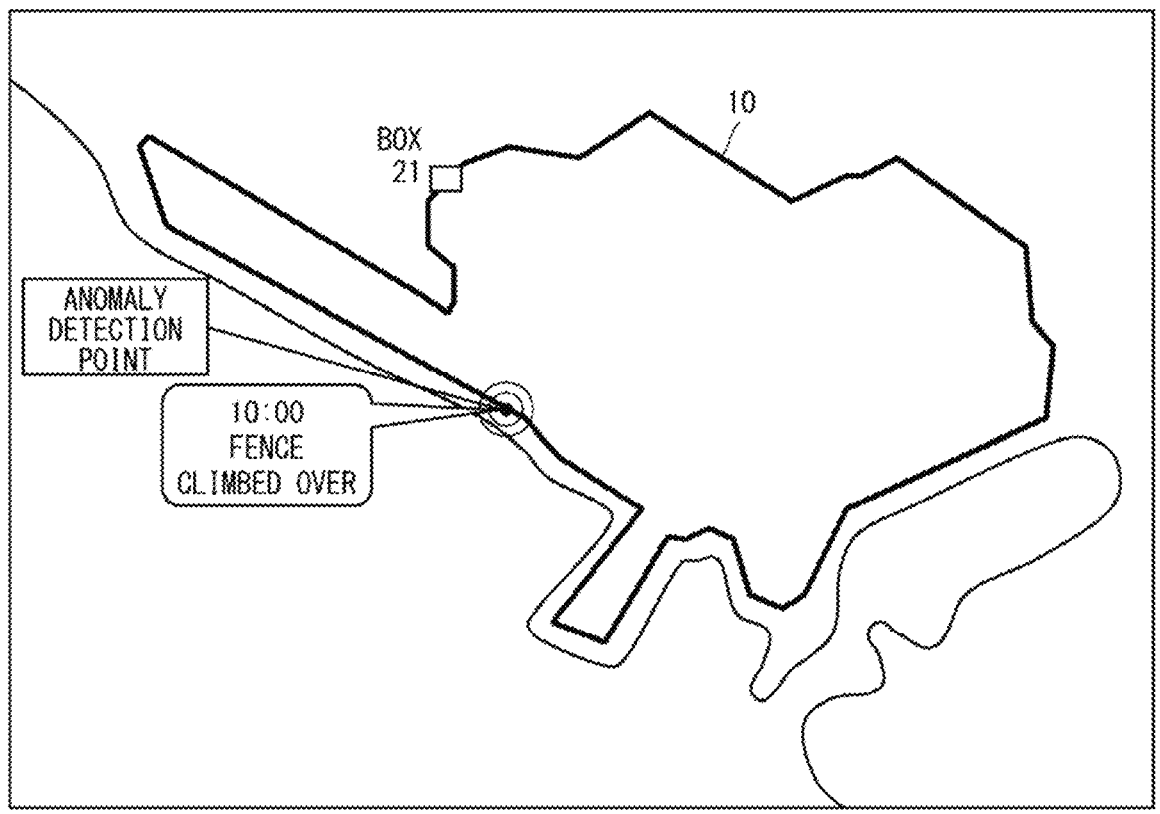
FIG. 3 is a diagram illustrating an example of a GUI screen displayed on a monitor by a control unit according to the first example embodiment.

As illustrated in FIG. 3, on the monitor 40, the control unit 30 displays, as the monitoring situation of the monitor area, the arrangement situation of the optical fiber 10 in an overlapping manner on a map of the monitor area, a mark (an anomaly detection point in the drawing) indicating the location on the optical fiber 10 where the detection unit 20 detected the anomaly, in an overlapping manner on a map of the monitor area, and information indicating the details of the anomaly detected by the detection unit 20, on the monitor 40. In this case, the control unit 30 displays, as information indicating the details of the anomaly, a time when the anomaly occurred and information indicating the type of the anomaly. However, the embodiment is not limited thereto, and the control unit 30 may display information indicating at least one of the time when the anomaly occurred and the type of the anomaly.

Also, as illustrated in FIG. 3, on the monitor 40, the control unit 30 may display, as the monitoring situation of the monitor area, the arrangement situation of the box 21 in an overlapping manner on a map of the monitor area.

Also, in a case where the anomaly detected by the detection unit 20 is, for example, the above-described anomaly (5) "a person or an animal walks around the fence F", the location on the optical fiber 10 where the detection unit 20 detected the anomaly moves. In this case, the detection unit 20 may identify the movement path of the location on the optical fiber 10 where the anomaly was detected, and the control unit 30 may display, on the monitor 40, the movement path of the location on the optical fiber 10 where the anomaly was detected, as the monitoring situation of the monitor area.

Next, hereinafter, an example of a flow of overall operation of the optical fiber sensing system according to this first example embodiment is explained with reference to FIG. 4.

Figure 4:
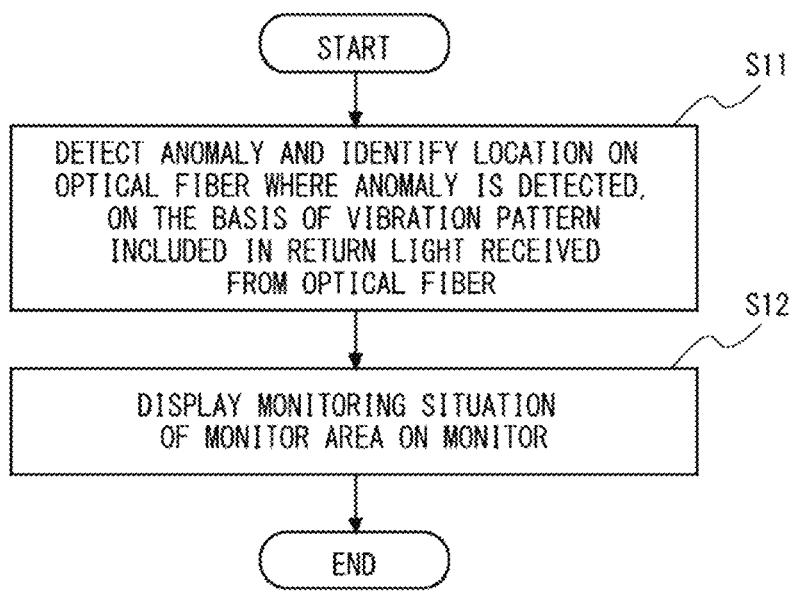
FIG. 4 is a flowchart illustrating an example of a flow of overall operation of the optical fiber sensing system according to the first example embodiment.

As illustrated in FIG. 4, the detection unit 20 detects an anomaly that has occurred in the monitor area and identifies the location where the anomaly was detected, on the basis of the vibration pattern included in the return light received from the optical fiber 10 provided on the fence F provided in the monitor area (step S11).

Subsequently, the control unit 30 displays the monitoring situation of the monitor area on the monitor 40 (step S12). At this occasion, for example, the control unit 30 displays the GUI screen as illustrated in FIG. 3 on the monitor 40.

As described above, according to this first example embodiment, the control unit 30 displays, on the monitor 40, the arrangement situation of the optical fiber 10 in an overlapping manner on a map of the monitor area, a mark indicating the location on the optical fiber 10 where the detection unit 20 detected the anomaly, in an overlapping manner on a map of the monitor area, and information indicating the details of the anomaly detected by the detection unit 20, as the monitoring situation of the monitor area. Therefore, the anomaly that the detection unit 20 detected using the optical fiber 10 can be displayed in a flexible display manner.

Second Example Embodiment

Next, an example of configuration of an optical fiber sensing system according to this second example embodiment is explained with reference to FIG. 5.

Figure 5:
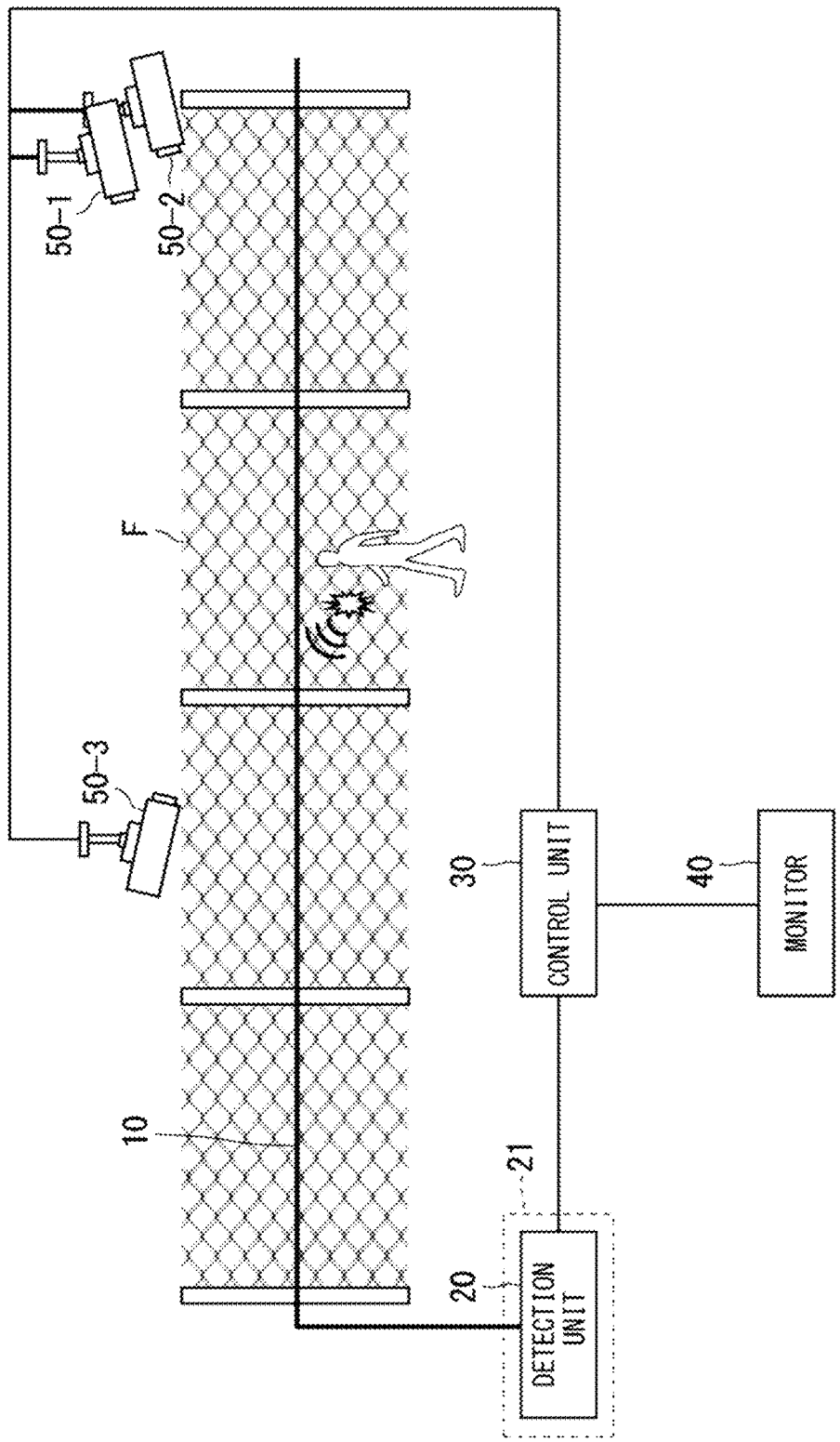
FIG. 5 is a diagram illustrating an example of configuration of an optical fiber sensing system according to a second example embodiment.

As illustrated in FIG. 5, the optical fiber sensing system according to this second example embodiment is different from the configuration of the above-described first example embodiment in that a plurality of cameras 50 (three cameras 50-1 to 50-3 in FIG. 5) are additionally provided. It should be noted that a connection between the cameras 50 and the control unit 30 may be made by wires or may be made wirelessly.

The cameras 50 are cameras for capturing images of the monitor area, and are achieved by, for example, a fixed camera, a pan tilt zoom (PTZ) camera, and the like. The cameras 50 may be installed be able to capture images of the entirety or a part of the monitor area, and the number of installed cameras 50 and the intervals of installation are not particularly limited.

The control unit 30 stores camera information indicating the installation locations of the respective cameras 50 (distances from the detection unit 20), a range in which image-capturing can be performed, and the like. When the detection unit 20 detects an anomaly that has occurred in the monitor area, the control unit 30 selects, from among the plurality of cameras 50, a camera 50 that captures images of the location where the anomaly was detected, on the basis of the above-described camera information, and controls the selected camera 50. For example, the control unit 30 controls an angle (an azimuth and an elevation), a zoom rate, and the like of the selected camera 50. Also, from among the plurality of cameras 50, the control unit 30 may select and control two or more cameras 50 that capture images of the location where the anomaly was detected.

Next, hereinafter, an example of a GUI screen displayed on the monitor 40 by the control unit 30 according to this second example embodiment is explained with reference to FIG. 6.

Figure 6:
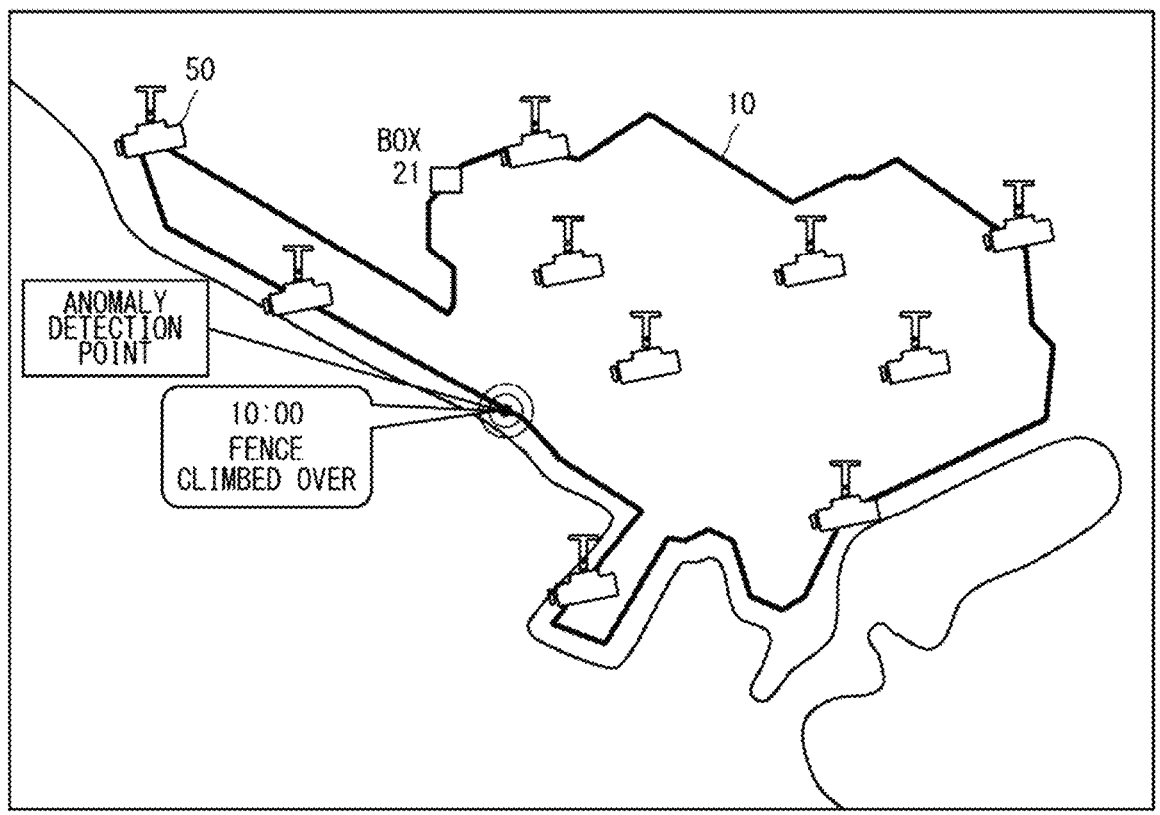
FIG. 6 is a diagram illustrating an example of a GUI screen displayed on a monitor by a control unit according to the second example embodiment.

As illustrated in FIG. 6, on the monitor 40, the control unit 30 displays, as the monitoring situation of the monitor area, what is similar to FIG. 3 of the above-described first example embodiment, and displays the arrangement situation of the camera 50 in an overlapping manner on a map of the monitor area.

Next, hereinafter, an example of a flow of overall operation of the optical fiber sensing system according to this second example embodiment is explained with reference to FIG. 7.

Figure 7:
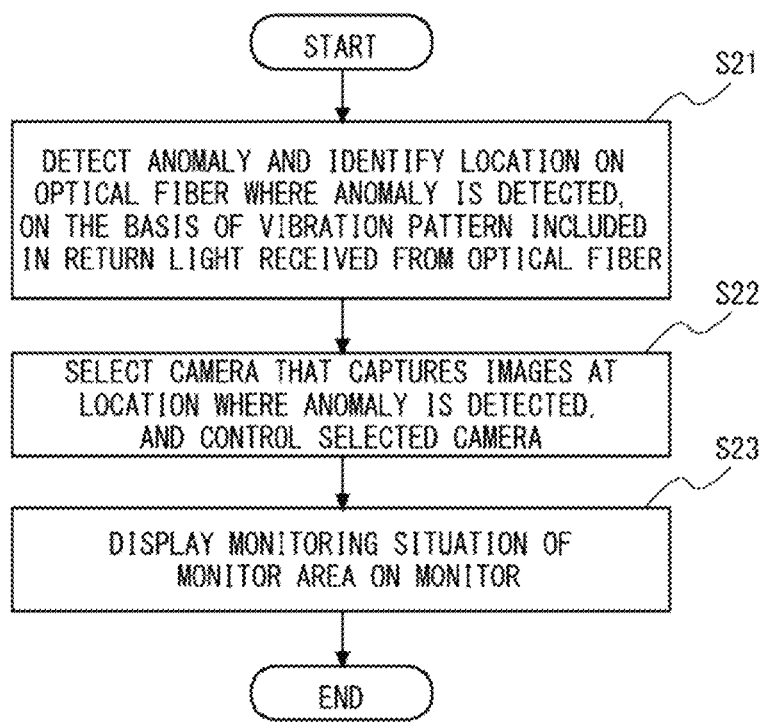
FIG. 7 is a flowchart illustrating an example of a flow of overall operation of the optical fiber sensing system according to the second example embodiment.

As illustrated in FIG. 7, on the basis of the vibration pattern included in the return light received from the optical fiber 10 provided on the fence F provided in the monitor area, the detection unit 20 detects an anomaly that has occurred in the monitor area, and identifies the location where the anomaly has been detected (step S21).

Subsequently, the control unit 30 selects, from among the plurality of cameras 50, a camera 50 that captures images at the location where the detection unit 20 detected the anomaly, and controls the selected camera 50 (step S22).

Subsequently, the control unit 30 displays the monitoring situation of the monitor area on the monitor 40 (step S23). At this occasion, for example, the control unit 30 displays the GUI screen as illustrated in FIG. 6 on the monitor 40.

As described above, according to this second example embodiment, on the monitor 40, the control unit 30 displays, as the monitoring situation of the monitor area, what is similar to the above-described first example embodiment, and displays the arrangement situation of the camera 50 in an overlapping manner on a map of the monitor area. Therefore, the detection unit 20 can display the anomaly detected using the optical fiber 10 in a more flexible display manner.

Third Example Embodiment

In the above-described second example embodiment, only one detection unit 20 is provided in the monitor area.

In contrast, according to this third example embodiment, the monitor area is divided into a plurality of sensing areas, and the detection units 20 corresponding to the respective sensing areas are provided, so that the detection units 20 monitor the corresponding sensing areas.

Figure 8:
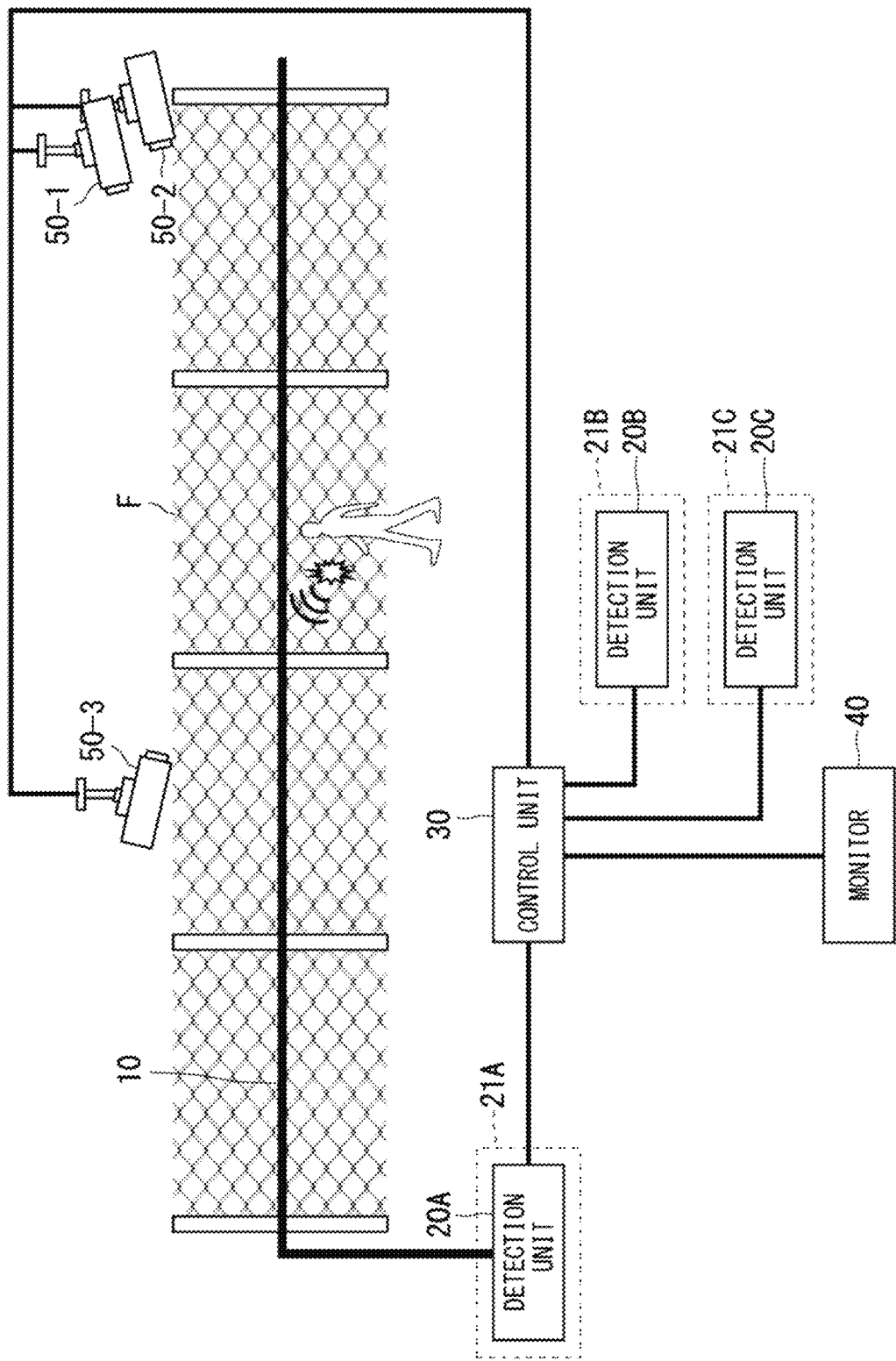
FIG. 8 is a diagram illustrating an example of configuration of an optical fiber sensing system according to a third example embodiment.

Hereinafter, an example of configuration an optical fiber sensing system according to this third example embodiment is explained with reference to FIG. 8. FIG. 8 illustrates an example in which the monitor area is divided into three sensing areas, but the number of divisions of the monitor area is not limited to three, so long as it is two or more.

As illustrated in FIG. 8, the optical fiber sensing system according to this third example embodiment is different from the configuration of the above-described second example embodiment in that three detection units 20A, 20B, and 20C are provided instead of the detection unit 20. The detection units 20A, 20B, and 20C are contained in the boxes 21A, 21B, and 21C, respectively. In FIG. 8, the optical fibers 10 connected to the detection units 20B and 20C are not illustrated.

In FIG. 8, the monitor area is divided into three sensing areas, and three detection units 20A, 20B, and 20C corresponding to the three sensing areas are provided. Accordingly, the respective sensing areas corresponding to the three detection units 20A, 20B, and 20C are monitored.

Figure 9:
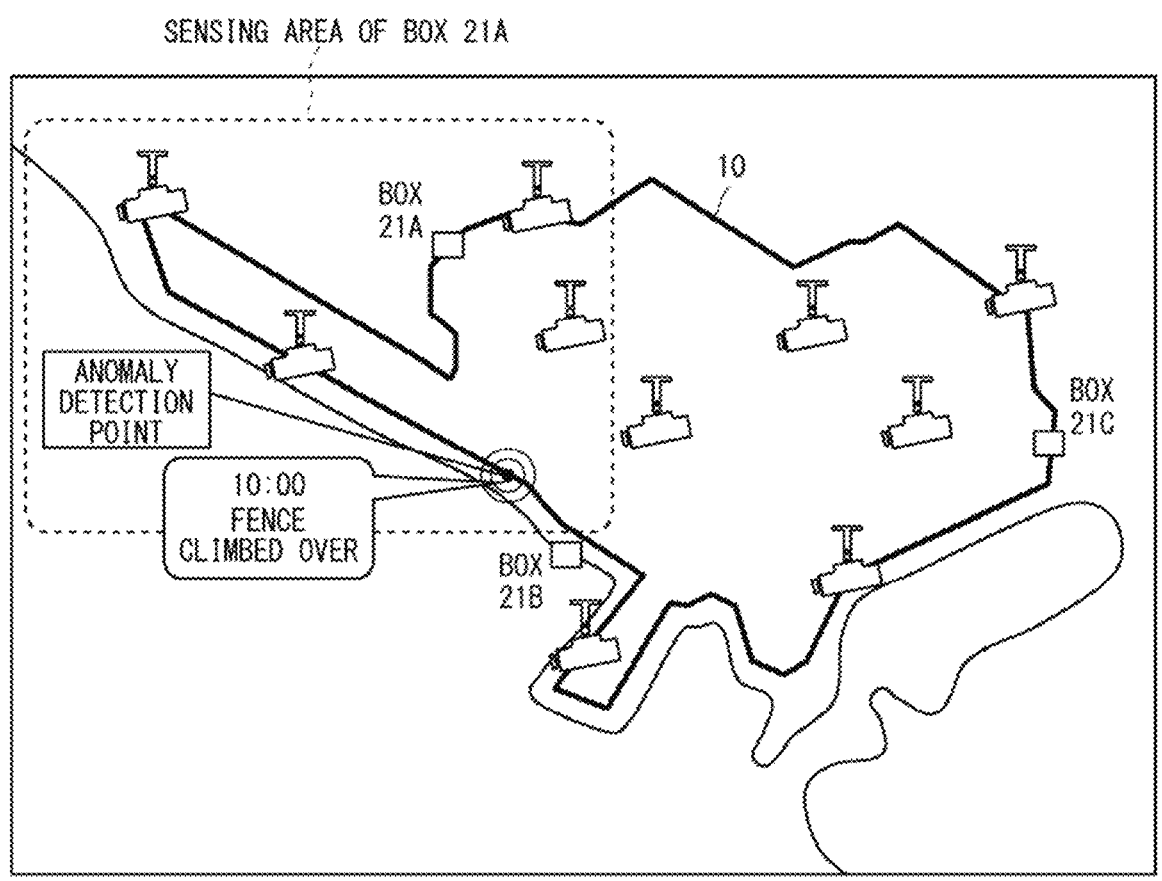
FIG. 9 is a diagram illustrating an example of a GUI screen displayed on a monitor by a control unit according to the third example embodiment.

Next, hereinafter, an example of a GUI screen displayed on the monitor 40 by the control unit 30 according to this third example embodiment is explained with reference to FIG. 9. FIG. 9 is an example in which the monitor area is divided into three sensing areas. In FIG. 9, it is assumed that the detection unit 20A contained in the box 21A monitors the sensing area between the box 21A and the box 21B, the detection unit 20B contained in the box 21B monitors the sensing area between the box 21B and the box 21C, and the detection unit 20C contained in the box 21C monitors the sensing area between the box 21C and the box 21A.

In a normal state in which an anomaly does not occur in the monitor area, the control unit 30 displays the monitoring situation as illustrated in FIG. 9 on the monitor 40. The monitoring situation as illustrated in FIG. 9 is different from the monitoring situation of FIG. 3 only in the number of boxes 21, and is similar the monitoring situation of FIG. 3 with respect to others features.

Also, for example, in a case where the detection unit 20A detects an anomaly, the control unit 30 enlarges and displays the monitoring situation of the sensing area (an area enclosed by a broken line in the drawing) monitored by the detection unit 20A. Similar operations are performed in a case where the detection units 20B and 20C detect anomalies.

Also, in a case where an icon of the box 21A displayed on the monitor 40 is clicked while the monitoring situation as illustrated in FIG. 9 is displayed on the monitor 40 in a normal state, the control unit 30 may enlarge and display the monitoring situation of the sensing area monitored by the detection unit 20A contained in the box 21A. Similar operations are performed in a case where the icons of the boxes 21B and 21C are clicked.

The flow of overall operation of the optical fiber sensing system according to this third example embodiment is similar to the flow of FIG. 7 of the above-described second example embodiment. In step S23, for example, the control unit 30 displays the GUI screen illustrating the monitoring situation as illustrated in FIG. 9 on the monitor 40. Then, for example, in a case where the detection unit 20A detects an anomaly, the control unit 30 displays, on the monitor 40, the GUI screen in which the monitoring situation of the sensing area monitored by the detection unit 20A is enlarged.

As described above, according to this third example embodiment, the monitor area is divided into a plurality of sensing areas, and the detection units 20 corresponding to the respective sensing areas are provided, so that the detection units 20 monitor the corresponding sensing areas. Furthermore, in a case where any one of the plurality of detection units 20 detects an anomaly, the control unit 30 enlarges and displays, on the monitor 40, the monitoring situation of the sensing area monitored by the detection unit 20 that detected the anomaly. Therefore, a portion around the location where the detection unit 20 detected the anomaly can be enlarged and displayed, and therefore, the anomaly detected by the detection unit 20 using the optical fiber 10 can be displayed in a more flexible display manner.

Fourth Example Embodiment

In the above-described second example embodiment, only one monitor area is provided.

In contrast, this fourth example embodiment, a plurality of monitor areas are provided, and the detection units 20 corresponding to the respective monitor areas are provided, so that the detection units 20 monitor the corresponding monitor areas.

The configuration of the optical fiber sensing system according to this fourth example embodiment may be similar to the above-described third example embodiment. For example, in a case where three monitor areas are provided, the configuration of the optical fiber sensing system according to this fourth example embodiment may be similar to FIG. 8. In this case, the three detection units 20A, 20B, and 20C may correspond to three monitor areas, and three detection units 20A, 20B, and 20C may monitor the corresponding monitor areas.

Figure 10:
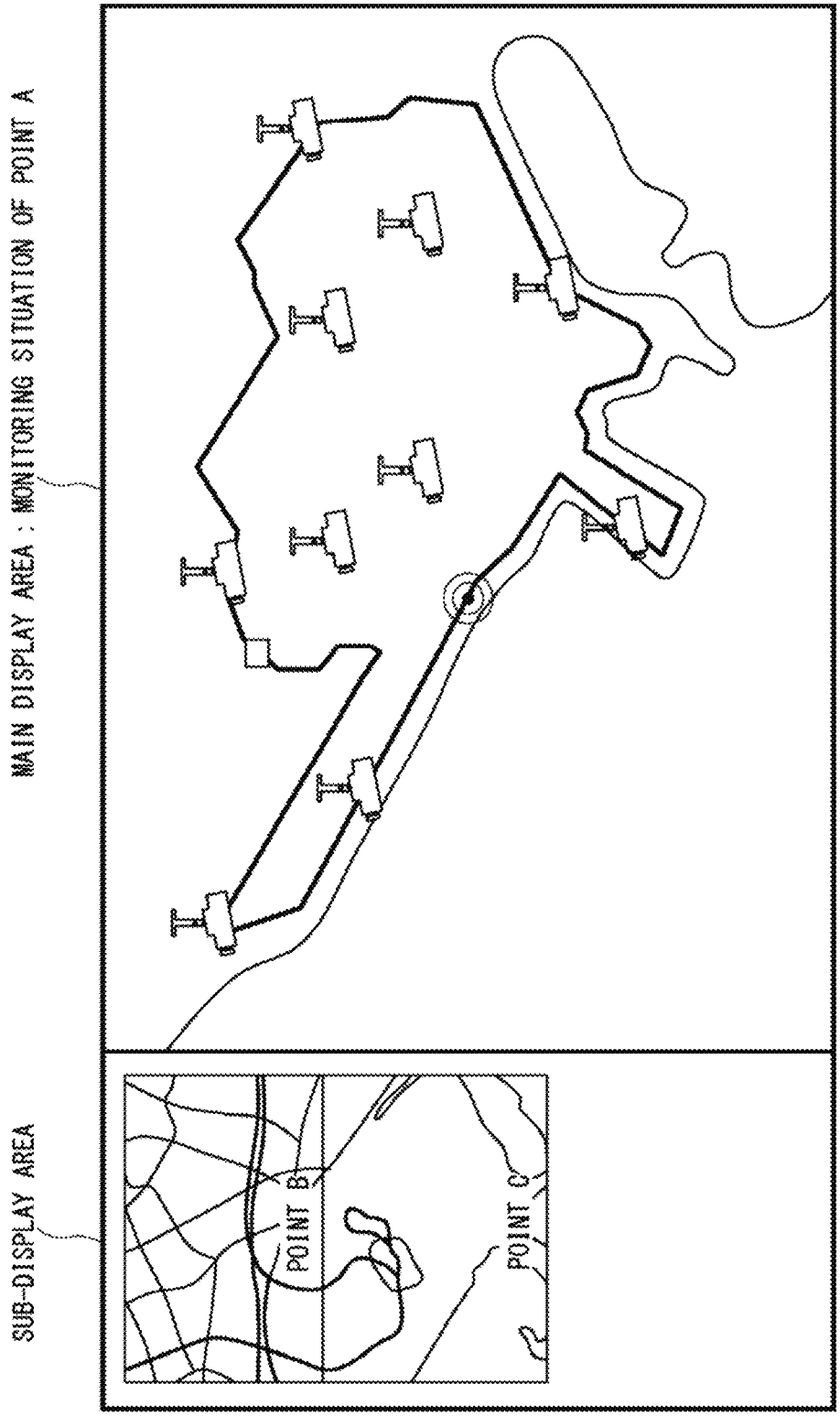
FIG. 10 is a diagram illustrating an example of a GUI screen displayed on a monitor by a control unit according to a fourth example embodiment.

Next, hereinafter, an example of a GUI screen displayed on the monitor 40 by the control unit 30 according to this fourth example embodiment is explained with reference to FIG. 10. FIG. 10 is an example where three monitor areas (points A, B, and C) are provided. In FIG. 10, it is assumed that the detection unit 20A monitors the point A, the detection unit 20B monitors the point B, and the detection unit 20C monitors the point C.

As illustrated in FIG. 10, the control unit 30 displays the monitoring situation of one monitor area (in this case, the point A) from among the three monitor areas (the points A, B, and C) in the main display area of the monitor 40. In this case, the displayed monitoring situation is similar to FIG. 6 (however, in FIG. 10, information indicating the details of the anomaly is not illustrated). In addition, the control unit 30 displays, in the sub-display area of the monitor 40, a map of the remaining monitor areas (in this case, the points B and C) of the three monitor areas (the points A, B, and C).

In a case where the point B displayed in the sub-display area of the monitor 40 is clicked, the control unit 30 displays the monitoring situation of the point B in the main display area of the monitor 40. With respect to the point A that was displayed in the main display area of the monitor 40 until then, the control unit 30 displays the map of the point A in the sub-display area of the monitor 40. Similar operations are performed in a case where the point C is clicked.

The flow of overall operation of the optical fiber sensing system according to this fourth example embodiment is similar to the flow of FIG. 7 of the above-described second example embodiment. However, in step S23, for example, the control unit 30 displays the GUI screen as illustrated in FIG. 10 on the monitor 40.

As described above, according to this fourth example embodiment, a plurality of monitor areas are provided, and the detection units 20 corresponding to the respective monitor areas are provided, so that the detection units 20 monitor the corresponding monitor areas. Furthermore, the control unit 30 displays, in the main display area of the monitor 40, the monitoring situation of one monitor area of the plurality of monitor areas, and displays, in the sub-display area of the monitor 40, the map of the remaining monitor areas of the plurality of monitor areas. Therefore, the monitoring situation of a plurality of monitor areas can be displayed, and therefore, the anomaly detected by the detection unit 20 using the optical fiber 10 can be displayed in a more flexible display manner.

Fifth Example Embodiment

This fifth example embodiment is an example in which a plurality of monitor areas are provided in a manner similar to the above-described fourth example embodiment. Therefore, the configuration of the optical fiber sensing system according to this fifth example embodiment may be similar to the above-described fourth example embodiment.

Figure 11:
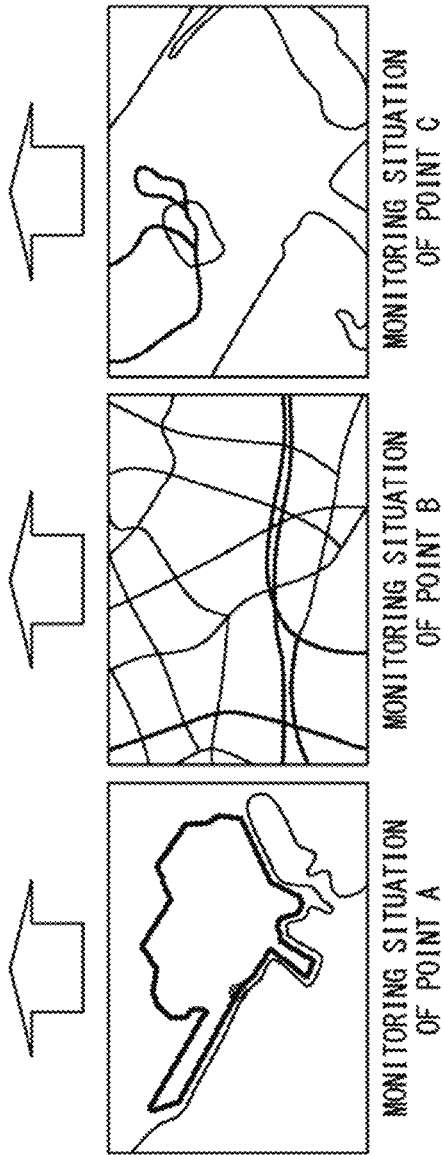
FIG. 11 is a diagram illustrating an example of a GUI screen displayed on a monitor by a control unit according to a fifth example embodiment.

Next, hereinafter, an example of a GUI screen displayed on the monitor 40 by the control unit 30 according to this fifth example embodiment is explained with reference to FIG. 11. FIG. 11 is an example in which the three monitor areas (the points A, B, and C) are provided. In FIG. 11, it is assumed that the detection unit 20A monitors the point A, the detection unit 20B monitors the point B, and the detection unit 20C monitors the point C.

The detection units 20A, 20B, and 20C detect anomalies that occur in the three monitor areas (the points A, B, and C), respectively. In a case where the detection units 20A, 20B, and 20C detect anomalies, the detection units 20A, 20B, and 20C identify the types of the anomalies, and identify the times when the anomalies were detected.

As illustrated in FIG. 11, the control unit 30 displays the monitoring situations of the three monitor areas (the points A, B, and C) on the monitor 40. The monitoring situation displayed in this case is assumed to be similar to FIG. 6 (however, in FIG. 11, information indicating the details of the anomaly is omitted). Furthermore, the control unit 30 displays, on the monitor 40, information indicating the monitor area in which the anomaly was detected, information indicating the type of the anomaly, and information indicating the time when the anomaly was detected, with respect to each of the anomalies that have occurred in the three monitor areas (the points A, B, and C).

The flow of overall operation of the optical fiber sensing system according to this fifth example embodiment is similar to the flow of FIG. 7 of the above-described second example embodiment. However, in step S23, for example, the control unit 30 displays the GUI screen as illustrated in FIG. 11 on the monitor 40.

As described above, according to this fifth example embodiment, in a case where a plurality of monitor areas are provided, the control unit 30 displays, on the monitor 40, information indicating the monitor area in which the anomaly was detected, information indicating the type of the anomaly, and information indicating the time when the anomaly was detected, with respect to each of the anomalies that have occurred in the monitor areas. Therefore, the monitoring situations of a plurality of monitor areas can be displayed in an integrated manner, and therefore, the anomaly detected by the detection unit 20 using the optical fiber 10 can be displayed in a flexible display manner.

Sixth Example Embodiment

A configuration of an optical fiber sensing system according to this sixth example embodiment may be similar to any one of the above-described second to fifth example embodiments. Hereinafter, the configuration of the optical fiber sensing system according to this sixth example embodiment is assumed to be similar to the above-described second example embodiment.

Next, hereinafter, an example of a GUI screen displayed on the monitor 40 by the control unit 30 according to this sixth example embodiment is explained with reference to FIG. 12.

Figure 12:
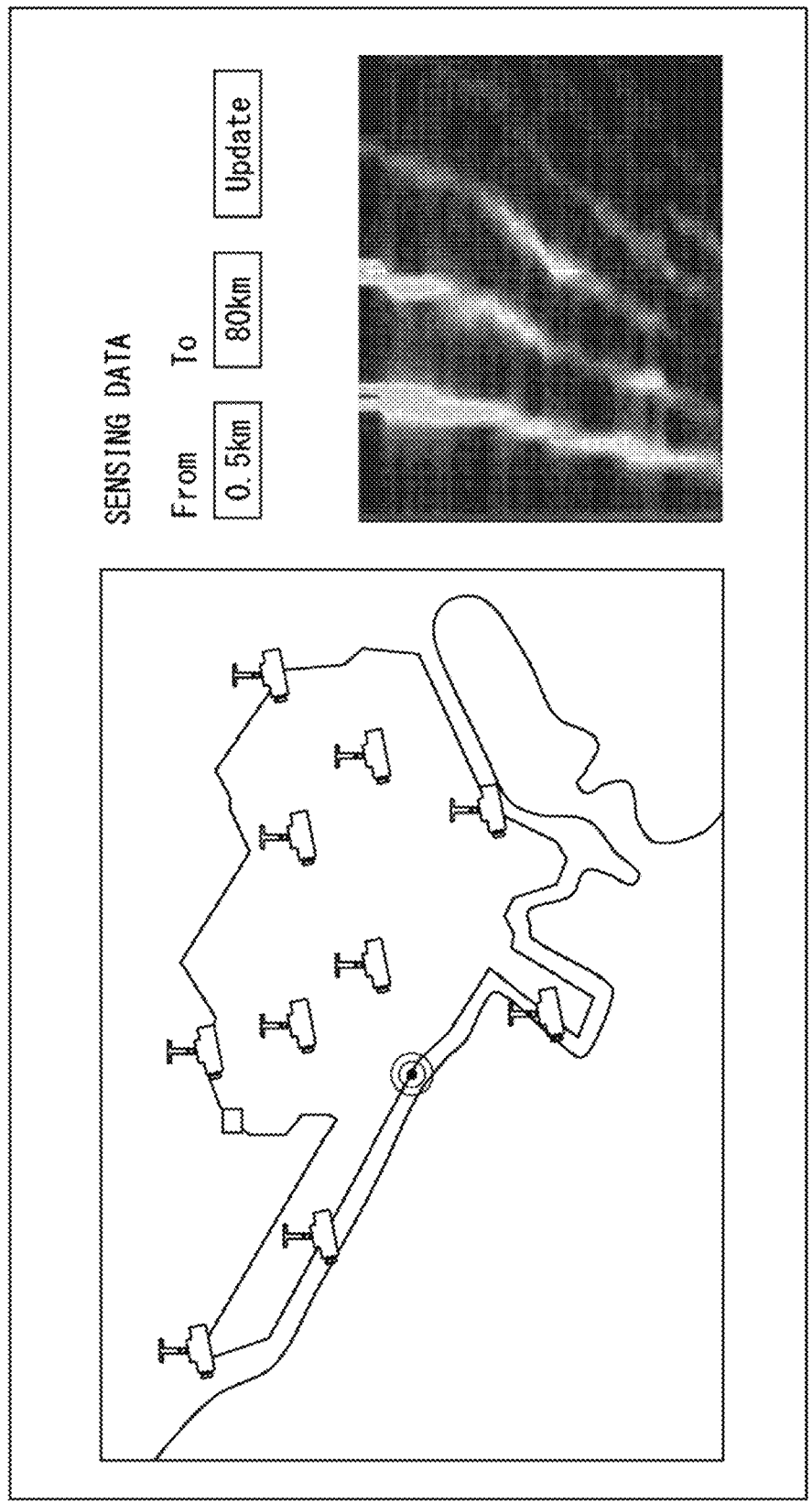
FIG. 12 is a diagram illustrating an example of a GUI screen displayed on a monitor by a control unit according to a sixth example embodiment.

As illustrated in FIG. 12, on the monitor 40, the control unit 30 displays, as the monitoring situation of the monitor area, what is similar to FIG. 6 of the above-described second example embodiment (however, in FIG. 12, information indicating the details of the anomaly is not illustrated). Furthermore, on the monitor 40, the control unit 30 displays, as the monitoring situation of the monitor area, sensing data indicating a vibration pattern included in return light received from the optical fiber 10. The sensing data as illustrated in FIG. 12 is sensing data similar to FIG. 2, in which the horizontal axis indicates a location on the optical fiber 10 (a distance from the detection unit 20), and the vertical axis indicates an elapse of time, and is generated by the detection unit 20.

Also, in the example of FIG. 12, the user can specify the range of the sensing data. In the example of FIG. 12, the user specifies sensing data in a range of a distance of 0.5 km to 80 km from the detection unit 20, and the control unit 30 acquires the sensing data specified by the user from the detection unit 20, and displays the sensing data on the monitor 40.

In a case where a plurality of detection units 20 are provided as in the above-described third to fifth example embodiments, the user may be allowed to specify the range of sensing data in units of detection units 20 (boxes 21). For example, in a case where the user specifies the detection unit 20A (the box 21A), the control unit 30 acquires, from the detection unit 20, sensing data of the entireties of the sensing areas or the entirety of the monitor area monitored by the detection unit 20A, and displays the sensing data on the monitor 40.

The flow of overall operation of the optical fiber sensing system according to this sixth example embodiment is similar to the flow of FIG. 7 of the above-described second example embodiment. However, in step S23, for example, the control unit 30 displays the GUI screen as illustrated in FIG. 12 on the monitor 40.

As described above, according to this sixth example embodiment, on the monitor 40, the control unit 30 displays, as the monitoring situation of the monitor area, what is similar to the above-described second example embodiment, and also displays sensing data indicating the vibration pattern included in the return light. Therefore, the anomaly detected by the detection unit 20 using the optical fiber 10 can be displayed in a more flexible display manner.

Seventh Example Embodiment

Next, an example of configuration of an optical fiber sensing system according to this seventh example embodiment is explained with reference to FIG. 13.

Figure 13:
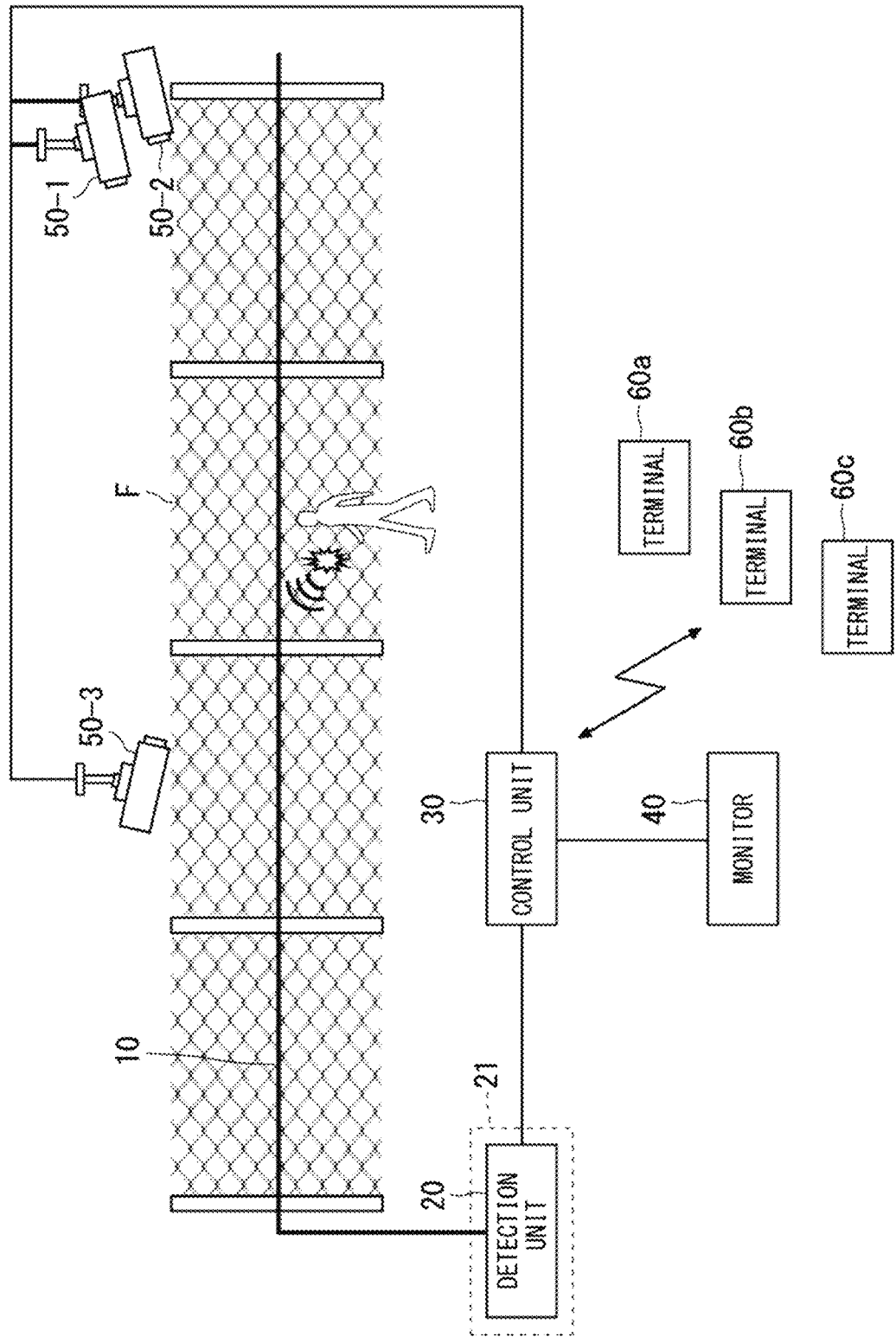
FIG. 13 is a diagram illustrating an example of configuration of an optical fiber sensing system according to a seventh example embodiment.

As illustrated in FIG. 13, the optical fiber sensing system according to this seventh example embodiment is different from the above-described second example embodiment in that terminals 60 (in FIG. 13, three terminals 60a, 60b, and 60c) owned by observers dispatched to the monitor areas are additionally provided. A connection between the terminals 60 and the control unit 30 are made wirelessly. In FIG. 13, the three terminals 60a, 60b, and 60c are provided, but the number of terminals 60 may be one or more.

The control unit 30 displays, on the terminals 60a, 60b, and 60c, a GUI screen indicating a part of the monitoring situation of the monitor area displayed on the monitor 40.

Next, hereinafter, an example of a GUI screen that the control unit 30 according to this seventh example embodiment displays on the monitor 40 and the displays of the terminals 60a, 60b, and 60c is explained with reference to FIG. 14.

As illustrated in FIG. 14, on the monitor 40, the control unit 30 displays the monitoring situation of the monitor area similar to FIG. 6 (however, in FIG. 14, information indicating the details of the anomaly is not illustrated). In contrast, the control unit 30 displays, on the displays of the terminals 60a, 60b, and 60c, a part of the monitoring situation of the monitor area displayed on the monitor 40. In the example of FIG. 14, the control unit 30 displays, as the part of the monitoring situation of the monitor area displayed on the monitor 40, the monitoring situation of the area including the location on the optical fiber 10 where the detection unit 20 has detected the anomaly, on the displays of the terminals 60a, 60b, and 60c.

Next, hereinafter, an example of a flow of overall operation of the optical fiber sensing system according to this seventh example embodiment is explained with reference to FIG. 15.

Figure 15:
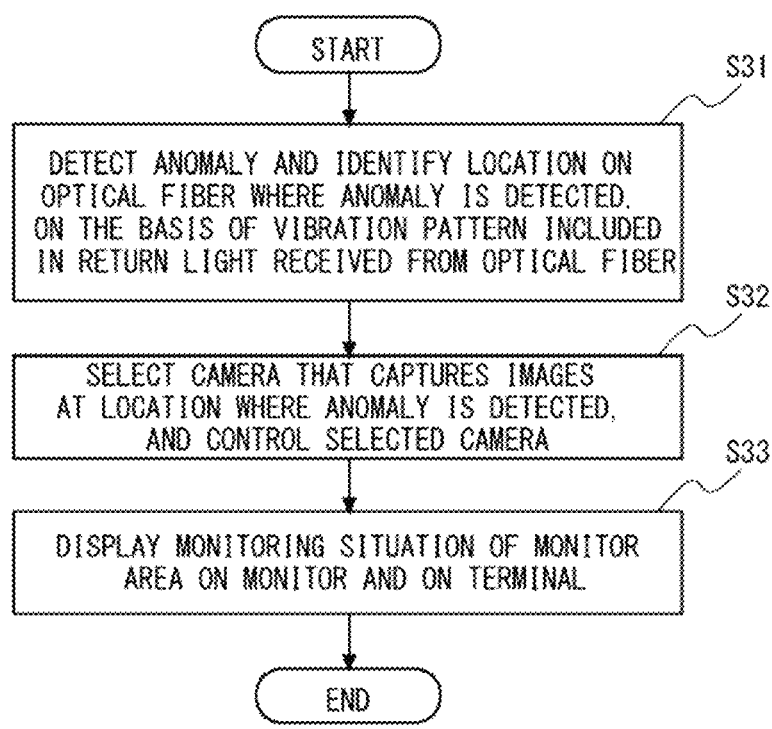
FIG. 15 is a flowchart illustrating an example of a flow of overall operation of the optical fiber sensing system according to the seventh example embodiment.

As illustrated in FIG. 15, first, steps S31 and S32 similar to steps S21 and S22 of FIG. 7 are performed.

Subsequently, the control unit 30 displays, on the monitor 40, the monitoring situation of the monitor area, and displays, on the displays of the terminals 60a, 60b, and 60c, a part of the monitoring situation of the monitor area displayed on the monitor 40 (step S33). At this occasion, for example, the control unit 30 displays the GUI screen as illustrated in FIG. 14, on the monitor 40 and the displays of the terminals 60a, 60b, and 60c.

As described above, according to this seventh example embodiment, the control unit 30 displays, on the monitor 40, the monitoring situation of the monitor area, and displays, on the displays of the terminals 60 owned by the observers, a part of the monitoring situation of the monitor area displayed on the monitor 40. Therefore, the anomaly detected by the detection unit 20 using the optical fiber 10 can be displayed in a more flexible display manner. The monitoring situation can be shared by the monitor 40 and the terminals 60 owned by the observers.

Other Example Embodiments

In the above-described example embodiments, the monitor area is assumed to be an area where a fence is installed, but the example embodiments are not limited thereto. The monitor area may be any area, regardless of whether a fence is provided. For example, the monitor area may be borders, facilities, amusement parks, penitentiaries, airports, places therearound, and the like.

Also, although the detection unit 20 and the control unit 30 are indicated in the drawings as independent constituent elements in the above-described example embodiments, the detection unit 20 and the control unit 30 may be provided in a single apparatus (optical fiber sensing apparatus), or may be provided in a plurality of apparatuses in a distributed manner.

<Hardware Configuration of Optical Fiber Sensing Apparatus>

As described above, the detection unit 20 and the control unit 30 may be provided in a single apparatus (optical fiber sensing apparatus).

Therefore, next, hereinafter, hardware configuration of a computer 70 that implements optical fiber sensing apparatus including the detection unit 20 and the control unit 30 is explained with reference to FIG. 16.

Figure 16:
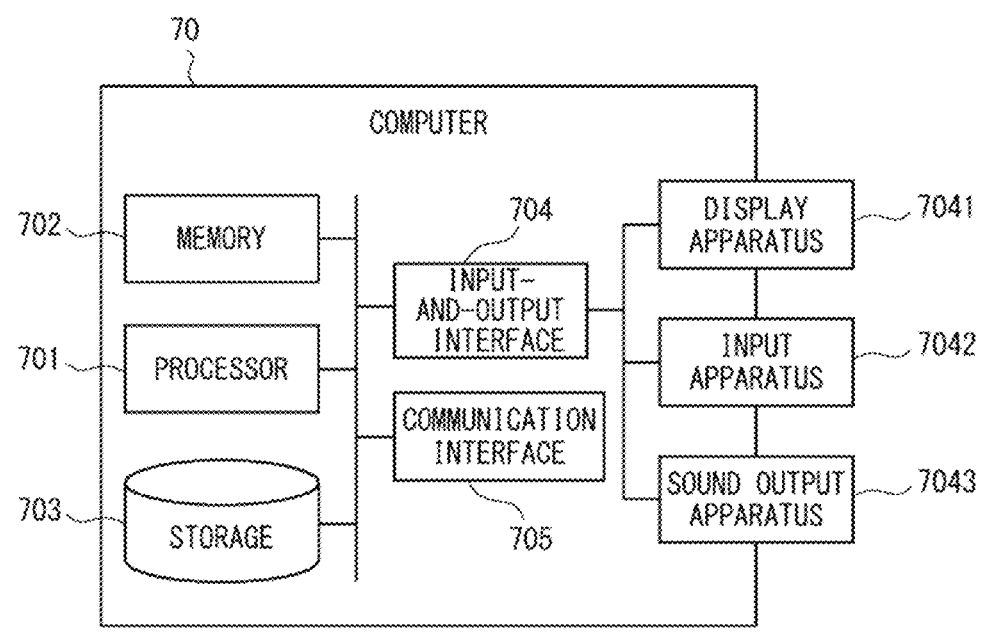
FIG. 16 is a block diagram illustrating an example of hardware configuration of a computer that achieves an optical fiber sensing apparatus.

As illustrated in FIG. 16, the computer 70 includes a processor 701, a memory 702, a storage 703, an input-and-output interface (an input-and-output I/F) 704, a communication interface (a communication I/F) 705, and the like. The processor 701, the memory 702, the storage 703, the input-and-output interface 704, and the communication interface 705 are connected by a data transmission path for transmitting and receiving data with each other.

The processor 701 is an arithmetic processing unit such as, for example, a CPU (Central Processing Unit), a GPU (Graphics Processing Unit), or the like. For example, the memory 702 is a memory such as a RAM (Random Access Memory), a ROM (Read Only Memory), or the like. The storage 703 is a storage device such as, for example, an HDD (Hard Disk Drive), an SSD (Solid State Drive), a memory card, or the like. Also, the storage 703 may be a memory such as a RAM, a ROM, or the like.

The storage 703 stores programs that achieve the functions of the constituent element (the detection unit 20 and the control unit 30) provided in the optical fiber sensing apparatus. The processor 701 achieves the functions of the constituent elements provided in the optical fiber sensing apparatus by executing the programs. In this case, when executing the above-described programs, the processor 701 may execute the programs upon reading the programs to the memory 702, or may execute the programs without reading the programs to the memory 702. The memory 702 and the storage 703 may also achieves the function of storing information and data held by the constituent elements provided in the optical fiber sensing apparatus.

The above-described programs may be stored using various types of non-transitory computer readable media and provided to a computer (including the computer 70). The non-transitory computer readable media include various types of tangible storage media. Examples of non-transitory computer readable media include a magnetic recording medium (for example, a flexible disk, a magnetic tape, and a hard disk drive), a magneto-optical recording medium (for example, a magneto-optical disk), a CD-ROM (Compact Disc-ROM), a CD-R (CD-Recordable), a CD-R/W (CD-ReWritable), a semiconductor memory (for example, a mask ROM, a PROM (Programmable ROM), an EPROM (Erasable PROM), a flash ROM, and a RAM. The programs may be provided to the computer by various types of transitory computer readable media. Examples of transitory computer readable media include electric signals, optical signals, and electromagnetic waves. The transitory computer readable media can provide the programs to the computer via a wired communication path such as an electric wire and an optical fiber or via a wireless communication path.

The input-and-output interface 704 is connected to a display device 7041, an input device 7042, a sound output device 7043, and the like. The display device 7041 is a device, such as an LCD (Liquid Crystal Display), a CRT (Cathode Ray Tube) display, a monitor, or the like, that displays a screen associated to drawing data processed by the processor 701. The input device 7042 is a device that receives operator's operation inputs, such as, for example, a keyboard, a mouse, a touch sensor, or the like. The display device 7041 and the input device 7042 may be integrated and achieved as a touch panel. The sound output device 7043 is a device, such as a speaker, that outputs sound associated to sound data processed by the processor 701.

The communication interface 705 transmits and receives data to and from an external device. For example, the communication interface 705 communicates with an external device via a wired communication path or a wireless communication path.

Although the present disclosure has been described above with reference to the example embodiments, the present disclosure is not limited to the above-described example embodiments. With respect to the configuration and details of the present disclosure, various changes that can be understood by those skilled in the art can be made within the scope of the present disclosure.

For example, some or all of the above-described example embodiments may be used in combination.

Also, some or all of the above-described example embodiments may be described as shown in the following Supplementary Notes, but are not limited thereto.

(Supplementary Note 1)

An optical fiber sensing system comprising:
an optical fiber provided in a monitor area;
a detection unit configured to monitor the monitor area by using the optical fiber;
a monitor; and
a control unit configured to display a monitoring situation of the monitor area on the monitor, wherein
the detection unit detects an anomaly that has occurred in the monitor area and identifies a location on the optical fiber where the anomaly is detected, based on a vibration pattern included in an optical signal received from the optical fiber, and
the control unit displays, on the monitor, as a monitoring situation of the monitor area, an arrangement situation of the optical fiber in an overlapping manner on a map of the monitor area, a mark indicating a location on the optical fiber where the anomaly is detected, in an overlapping manner on the map of the monitor area, and information indicating a detail of the anomaly.

(Supplementary Note 2)

The optical fiber sensing system according to Supplementary Note 1, wherein
the detection unit identifies a type of the anomaly, based on a vibration pattern included in the optical signal, and
the control unit displays, on the monitor, information indicating a type of the anomaly, as information indicating a detail of the anomaly.

(Supplementary Note 3)

The optical fiber sensing system according to Supplementary Note 1, wherein,
in a case where a location on the optical fiber where the anomaly is detected moves, the detection unit identifies a movement path of the location, and
the control unit further displays, on the monitor, the movement path, as a monitoring situation of the monitor area.

(Supplementary Note 4)

The optical fiber sensing system according to Supplementary Note 1, wherein
the monitor area is divided into a plurality of sensing areas,
a plurality of the detection units corresponding to the plurality of sensing areas are provided,
each of a plurality of the detection units monitors the corresponding sensing area, and,
in a case where any of a plurality of the detection units detects the anomaly, the control unit enlarges and displays, on the monitor, a monitoring situation of a sensing area being monitored by the detection unit that detects the anomaly.

(Supplementary Note 5)

The optical fiber sensing system according to Supplementary Note 1, wherein
a plurality of the monitor areas are provided,
a plurality of the detection units corresponding to a plurality of the monitor areas are provided,
each of a plurality of the detection units monitors the corresponding monitor area,
in a main display area of the monitor, the control unit displays a monitoring situation of one monitor area among a plurality of the monitor areas, and,
in a sub-display area of the monitor, the control unit displays a map of a remaining monitor area among a plurality of the monitor areas.

(Supplementary Note 6)

The optical fiber sensing system according to Supplementary Note 1, wherein
a plurality of the monitor areas are provided,
a plurality of the detection units corresponding to a plurality of the monitor areas are provided,
each of a plurality of the detection units monitors the corresponding monitor area,
each of a plurality of the detection units identifies a type of the anomaly and identifies a time when the anomaly occurs, based on a vibration pattern included in the optical signal,
the control unit displays, on the monitor, monitoring situations of a plurality of the monitor areas, and information indicating the monitor area in which the anomaly is detected, information indicating a type of the anomaly, and information indicating a time when the anomaly is detected, with respect to each of anomalies that have occurred in a plurality of the monitor areas.

(Supplementary Note 7)

The optical fiber sensing system according to Supplementary Note 1, wherein
the detection unit generates sensing data indicating a vibration pattern included in the optical signal, and
the control unit further displays, on the monitor, the sensing data as a monitoring situation of the monitor area.

(Supplementary Note 8)

The optical fiber sensing system according to Supplementary Note 1, further comprising a terminal,
wherein the control unit displays, on the terminal, a part of a monitoring situation of the monitor area that is displayed on the monitor.

(Supplementary Note 9)

A monitoring method by an optical fiber sensing system, the optical fiber sensing system including:
an optical fiber provided in a monitor area;
a detection unit configured to monitor the monitor area by using the optical fiber; and
a monitor,
the monitoring method comprising:

a first step of, by the detection unit, detecting an anomaly that has occurred in the monitor area and identifying a location on the optical fiber where the anomaly is detected, based on a vibration pattern included in an optical signal received from the optical fiber; and a second step of displaying, on the monitor, as a monitoring situation of the monitor area, an arrangement situation of the optical fiber in an overlapping manner on a map of the monitor area, a mark indicating a location on the optical fiber where the anomaly is detected in an overlapping manner on the map of the monitor area, and information indicating a detail of the anomaly.

(Supplementary Note 10)

The monitoring method according to Supplementary Note 9, wherein, in the first step, the detection unit identifies a type of the anomaly, based on a vibration pattern included in the optical signal, and the second step includes displaying, on the monitor, information indicating a type of the anomaly, as information indicating a detail of the anomaly.

(Supplementary Note 11)

The monitoring method according to Supplementary Note 9, wherein, in the first step, in a case where a location on the optical fiber where the anomaly is detected moves, the detection unit identifies a movement path of the location, and the second step includes displaying, on the monitor, the movement path as a monitoring situation of the monitor area.

(Supplementary Note 12)

The monitoring method according to Supplementary Note 9, wherein the monitor area is divided into a plurality of sensing areas, a plurality of the detection units corresponding to the plurality of sensing areas are provided, each of a plurality of the detection units monitors the corresponding sensing area, and, in the second step, in a case where any of a plurality of the detection units detects the anomaly, a monitoring situation of a sensing area being monitored by the detection unit that detects the anomaly is enlarged and displayed on the monitor.

(Supplementary Note 13)

The monitoring method according to Supplementary Note 9, wherein a plurality of the monitor areas are provided, a plurality of the detection units corresponding to a plurality of the monitor areas are provided, each of a plurality of the detection units monitors the corresponding monitor area, in the second step, in a main display area of the monitor, a monitoring situation of one monitor area among a plurality of the monitor areas is displayed, and, in a sub-display area of the monitor, a map of a remaining monitor area of a plurality of the monitor areas is displayed.

(Supplementary Note 14)

The monitoring method according to Supplementary Note 9, wherein a plurality of the monitor areas are provided, a plurality of the detection units corresponding to a plurality of the monitor areas are provided, each of a plurality of the detection units monitors the corresponding monitor area, in the first step, each of a plurality of the detection units identifies a type of the anomaly and identifies a time when the anomaly occurs, based on a vibration pattern included in the optical signal, and, in the second step, monitoring situations of a plurality of the monitor areas is displayed on the monitor, and information indicating the monitor area in which the anomaly is detected, information indicating a type of the anomaly, and information indicating a time when the anomaly is detected are displayed on the monitor, with respect to each of anomalies that have occurred in a plurality of the monitor areas.

(Supplementary Note 15)

The monitoring method according to Supplementary Note 9, wherein, in the first step, the detection unit generates sensing data indicating a vibration pattern included in the optical signal, and, in the second step, the sensing data is further displayed on the monitor, as a monitoring situation of the monitor area.

(Supplementary Note 16)

The monitoring method according to Supplementary Note 9, wherein the optical fiber sensing system further includes a terminal, and, in the second step, a part of a monitoring situation of the monitor area that is displayed on the monitor is displayed on the terminal.

REFERENCE SIGNS LIST

10 Optical fiber
20, 20A, 20B, 20C Detection unit
21, 21A, 21B, 21C Box
30 Control unit
40 Monitor
50, 50-1, 50-2, 50-3 Camera
60a, 60b, 60c Terminal
70 Computer
701 Processor
702 Memory
703 Storage
704 Input-and-output interface
7041 Display device
7042 Input device
7043 Sound output device
705 Communication interface
F Fence

The invention claimed is:

1. An optical fiber sensing system comprising:
an optical fiber provided in a monitor area;
a detection unit configured to monitor the monitor area by using the optical fiber;
a monitor; and
a control unit configured to display a monitoring situation of the monitor area on the monitor, wherein
the detection unit detects an anomaly that has occurred in the monitor area, identifies a location on the optical fiber where the anomaly is detected, based on a vibration pattern included in an optical signal received from the optical fiber, and generates sensing data indicating the vibration pattern included in the optical signal, and
the control unit displays, on the monitor, as a monitoring situation of the monitor area, an arrangement situation of the optical fiber in an overlapping manner on a map of the monitor area, a mark indicating a location on the optical fiber where the anomaly is detected, in an overlapping manner on the map of the monitor area, information indicating a detail of the anomaly, and the sensing data of a range specified by a user.

2. The optical fiber sensing system according to claim 1, wherein the detection unit identifies a type of the anomaly, based on the vibration pattern included in the optical signal, and
the control unit displays, on the monitor, information indicating the type of the anomaly, as the information indicating the detail of the anomaly.

3. The optical fiber sensing system according to claim 1, wherein, in a case where a location on the optical fiber where the anomaly is detected moves, the detection unit identifies a movement path of the location, and
the control unit further displays, on the monitor, the movement path, as the monitoring situation of the monitor area.

4. The optical fiber sensing system according to claim 1, wherein the monitor area is divided into a plurality of sensing areas,
a plurality of the detection units corresponding to the plurality of sensing areas are provided,
each of a plurality of the detection units monitors the corresponding sensing area, and,
in a case where any of a plurality of the detection units detects the anomaly, the control unit enlarges and displays, on the monitor, the monitoring situation of a sensing area being monitored by the detection unit that detects the anomaly.

5. The optical fiber sensing system according to claim 1, wherein a plurality of the monitor areas are provided,
a plurality of the detection units corresponding to a plurality of the monitor areas are provided,
each of a plurality of the detection units monitors the corresponding monitor area,
in a main display area of the monitor, the control unit displays the monitoring situation of one monitor area among a plurality of the monitor areas, and,
in a sub-display area of the monitor, the control unit displays a map of a remaining monitor area among a plurality of the monitor areas.

6. The optical fiber sensing system according to claim 1, wherein a plurality of the monitor areas are provided,
a plurality of the detection units corresponding to a plurality of the monitor areas are provided,
each of a plurality of the detection units monitors the corresponding monitor area,
each of a plurality of the detection units identifies a type of the anomaly and identifies a time when the anomaly occurs, based on the vibration pattern included in the optical signal,
the control unit displays, on the monitor, monitoring situations of a plurality of the monitor areas, and information indicating the monitor area in which the anomaly is detected, information indicating the type of the anomaly, and information indicating the time when the anomaly is detected, with respect to each of anomalies that have occurred in a plurality of the monitor areas.

7. The optical fiber sensing system according to claim 1, further comprising a terminal,
wherein the control unit displays, on the terminal, a part of the monitoring situation of the monitor area that is displayed on the monitor.

8. A monitoring method by an optical fiber sensing system,
the optical fiber sensing system including:
an optical fiber provided in a monitor area;
a detection unit configured to monitor the monitor area by using the optical fiber; and
a monitor,
the monitoring method comprising:
a first step of, by the detection unit, detecting an anomaly that has occurred in the monitor area, identifying a location on the optical fiber where the anomaly is detected, based on a vibration pattern included in an optical signal received from the optical fiber, and generating sensing data indicating the vibration pattern included in the optical signal; and
a second step of displaying, on the monitor, as a monitoring situation of the monitor area, an arrangement situation of the optical fiber in an overlapping manner on a map of the monitor area, a mark indicating a location on the optical fiber where the anomaly is detected in an overlapping manner on the map of the monitor area, information indicating a detail of the anomaly, and the sensing data of a range specified by a user.

9. The monitoring method according to claim 8, wherein, in the first step, the detection unit identifies a type of the anomaly, based on the vibration pattern included in the optical signal, and
the second step includes displaying, on the monitor, information indicating the type of the anomaly, as the information indicating the detail of the anomaly.

10. The monitoring method according to claim 8, wherein, in the first step, in a case where a location on the optical fiber where the anomaly is detected moves, the detection unit identifies a movement path of the location, and
the second step includes displaying, on the monitor, the movement path as the monitoring situation of the monitor area.

11. The monitoring method according to claim 8, wherein the monitor area is divided into a plurality of sensing areas,
a plurality of the detection units corresponding to the plurality of sensing areas are provided,
each of a plurality of the detection units monitors the corresponding sensing area, and,
in the second step, in a case where any of a plurality of the detection units detects the anomaly, the monitoring situation of a sensing area being monitored by the detection unit that detects the anomaly is enlarged and displayed on the monitor.

12. The monitoring method according to claim 8, wherein a plurality of the monitor areas are provided,
a plurality of the detection units corresponding to a plurality of the monitor areas are provided,
each of a plurality of the detection units monitors the corresponding monitor area,
in the second step, in a main display area of the monitor, the monitoring situation of one monitor area among a plurality of the monitor areas is displayed, and,
in a sub-display area of the monitor, a map of a remaining monitor area of a plurality of the monitor areas is displayed.

13. The monitoring method according to claim 8, wherein a plurality of the monitor areas are provided,
a plurality of the detection units corresponding to a plurality of the monitor areas are provided,
each of a plurality of the detection units monitors the corresponding monitor area,
in the first step, each of a plurality of the detection units identifies a type of the anomaly and identifies a time when the anomaly occurs, based on the vibration pattern included in the optical signal, and,
in the second step, monitoring situations of a plurality of the monitor areas is displayed on the monitor, information indicating the monitor area in which the anomaly is detected, information indicating the type of the anomaly, information indicating the time when the anomaly is detected are displayed on the monitor, with respect to each of anomalies that have occurred in a plurality of the monitor areas.

14. The monitoring method according to claim 8, wherein the optical fiber sensing system further includes a terminal, and, in the second step, a part of the monitoring situation of the monitor area that is displayed on the monitor is displayed on the terminal.

\* \* \* \* \*